(12) United States Patent
Tsitsulin et al.

(10) Patent No.: US 12,511,325 B2
(45) Date of Patent: Dec. 30, 2025

(54) RERANKING DOCUMENTS BASED ON GRAPH REPRESENTATIONS OF THE DOCUMENTS

(71) Applicant: Google LLC, Mountain View, CA (US)

(72) Inventors: Anton Tsitsulin, Jersey City, NJ (US); Bryan Thomas Perozzi, Cranford, NJ (US); Bahare Fatemi, Montreal (CA); Jialin Dong, Los Angeles, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/647,297

(22) Filed: Apr. 26, 2024

(65) Prior Publication Data

US 2025/0335486 A1   Oct. 30, 2025

(51) Int. Cl.
*G06F 16/338* (2019.01)
*G06F 16/35* (2025.01)
*G06F 16/901* (2019.01)

(52) U.S. Cl.
CPC ............ *G06F 16/338* (2019.01); *G06F 16/35* (2019.01); *G06F 16/9024* (2019.01)

(58) Field of Classification Search
CPC ..... G06F 16/338; G06F 16/35; G06F 16/9024
See application file for complete search history.

(56) References Cited

U.S. PATENT DOCUMENTS

| | | | |
|---|---|---|---|
| 9,892,110 B2 * | 2/2018 | Sexton | G06F 16/358 |
| 10,810,193 B1 * | 10/2020 | Subramanya | G06F 16/245 |
| 11,615,152 B2 * | 3/2023 | Haldar | G06N 3/047 |
| | | | 707/758 |
| 11,669,556 B1 * | 6/2023 | Hasan | G06F 16/9024 |
| | | | 707/736 |
| 2007/0185910 A1 * | 8/2007 | Koike | G06F 16/904 |
| 2014/0372956 A1 * | 12/2014 | Bisca | G06F 3/04817 |
| | | | 715/848 |
| 2022/0318316 A1 * | 10/2022 | Haldar | G06N 3/04 |
| 2023/0252234 A1 * | 8/2023 | Hoang | G06N 3/042 |
| | | | 704/9 |
| 2024/0126988 A1 * | 4/2024 | Amin | G06F 40/284 |

OTHER PUBLICATIONS

Asai et al., "Learning to Retrieve Reasoning Paths Over Wikipedia Graph for Question Answering", arXiv:1911.10470v2, Feb. 14, 2020, 22 pages.

(Continued)

*Primary Examiner* — Debbie M Le
(74) *Attorney, Agent, or Firm* — DORITY & MANNING P.A.

(57) ABSTRACT

A computer-implemented method includes: in response to receiving a query, retrieving a plurality of documents; generating a first graph representation which graphically represents the plurality of documents utilizing a plurality of nodes indicating a concept and a plurality of edges indicating a relationship between at least two nodes among the plurality of nodes; generating a second graph representation with respect to the plurality of documents, based on connection information associated with the first graph representation; ranking the plurality of documents, based on the second graph representation; and applying one or more machine-learned models to generate a response to the query based on the plurality of documents ranked based on the second graph representation.

20 Claims, 9 Drawing Sheets

(56) References Cited

OTHER PUBLICATIONS

Bai et al., "Graph Pre-Training for AMR Parsing and Generation", arXiv:2203.07836v4, May 4, 2022, 15 pages.
Bai et al., "Semantic Representation for Dialogue Modeling", arXiv:2105.10188v2, Jun. 1, 2021, 16 pages.
Banarescu, "Abstract Meaning Representation for Sembanking", Seventh Linguistic Annotation Workshop and Interoperability with Discourse, Sofia, Bulgaria, Aug. 8-9, 2013, 9 pages.
Costa et al., "Leveraging Knowledge Graph for Open-Domain Question Answering", 2018 Institute of Electrical and Electronics Engineers /WIC/ Association for Computing Machinery International Conference on Web Intelligence (WI), Santiago, Chile, Dec. 3-6, 2018, 6 pages.
Devlin et al., "BERT: Pre-training of Deep Bidirectional Transformers for Language Understanding", arXiv:1810.04805v2, May 24, 2019, 16 pages.
Dong et al., "Don't Forget to Connect! Improving RAG with Graph-based Reranking", arXiv:2405.18414v1, May 28, 2024, 19 pages.
Glass et al., "Re2G: Retrieve, Rerank, Generate", arXiv:2207.06300v1, Jul. 13, 2022, 15 pages.
Gong et al., "Exploiting Edge Features for Graph Neural Networks", arXiv: 1809.02709v2, Jan. 28, 2019, 10 pages.
Google et al., "PaLM 2 Technical Report", arXiv:2305.10403v3, Sep. 13, 2023, 93 pages.
Hamilton, "Inductive Representation Learning on Large Graphs", arXiv:1706.02216v4, Sep. 10, 2018, 19 pages.
Huang et al., "DSQA-LLM: Domain-Specific Intelligent Question Answering Based on Large Language Model", International Conference on AI-generated Content, Shanghai, China, Aug. 25-26, 2023.
Izacard et al., "Leveraging Passage Retrieval with Generative Models for Open Domain Question Answering", arXiv:2007.01282v2, Feb. 3, 2021, 6 pages.
Joshi et al., "TriviaQA: A Large Scale Distantly Supervised Challenge Dataset for Reading Comprehension", arXiv:1705.03551v2, May 13, 2017, 11 pages.
Ju et al., "Grape: Knowledge Graph Enhanced Passage Reader for Open-Domain Question Answering", arXiv:2210.02933v2, Oct. 10, 2022, 13 pages.
Karpukhin et al., "Dense Passage Retrieval for Open-Domain Question Answering", arXiv:2004.04906v3, Sep. 30, 2020, 13 pages.
Kipf, "Semi-Supervised Classification with Graph Convolutional Networks", arXiv:1609.02907v4, Feb. 22, 2017, 14 pages.
Kwiatkowski et al., "Natural Questions: A Benchmark for Question Answering Research", Transactions of the Association for Computational Linguistics, vol. 7, Apr. 2, 2019, 14 pages.
LangChain, "Enhancing RAG-Based Application Accuracy by Constructing and Leveraging Knowledge Graphs", Mar. 15, 2024, https://blog.langchain.dev/enhancing-rag-based-applications-accuracy-by-constructing-and-leveraging-knowledge-graphs/, retrieved on Jun. 17, 2024, 15 pages.
Lewis et al., "BART: Denoising Sequence-to-Sequence Pretraining for Natural Language Generation, Translation, and Comprehension", arXiv:1910.13461v1, Oct. 29, 2019, 10 pages.
Lewis et al., "Retrieval-Augmented Generation for Knowledge-Intensive NLP Tasks", arXiv:2005.11401v4, Apr. 12, 2021, 19 pages.
Li et al., "Improving Pairwise Ranking for Multi-Label Image Classification", arXiv:1704.03135v3, Jun. 1, 2017, 9 pages.
Li et al., "Towards General Text Embeddings with Multi-Stage Contrastive Learning", arXiv:2308.03281v1, Aug. 7, 2023, 18 pages.
Liu et al., "RoBERTa: A Robustly Optimized BERT Pretraining Approach", arXiv:1907.11692v1, Jul. 26, 2019, 13 pages.
Loshchilov et al., "Decoupled Weight Decay Regularization", arXiv:1711.05101v3, Jan. 4, 2019, 19 pages.
Ma et al., Fine-Tuning LLaMA for Multi-Stage Text Retrieval , arXiv:2310.08319v1, Oct. 12, 2023, 12 pages.
Microsoft Research Blog, "GraphRAG: Unlocking LLM Discovery on Narrative Private data", Feb. 13, 2024, https://www.microsoft.com/en-us/research/blog/graphrag-unlocking-llm-discovery-on-narrative-private-data/, retrieved on Jun. 17, 2024, 11 pages.
Naseem et al., "DocAMR: Multi-Sentence AMR Representation and Evaluation", arXiv:2112.08513v2, May 6, 2022, 10 pages.
Nogueira et al., "Document Ranking with a Pretrained Sequence-to-Sequence Model", arXiv:2003.06713v1, Mar. 14, 2020, 8 pages.
OpenAI, "GPT-4 is OpenAI's Most Advanced System, Producing Safer and More Useful Responses", https://openai.com/gpt-4, retrieved on Jun. 17, 2024, 7 pages.
OpenAI, "Pioneering Research on the Path to AGI", https://openai.com/research/, retrieved on Jun. 17, 2024.
Park et al., "RINK: Reader-Inherited Evidence Reranker for Table-and-Text Open Domain Question Answering", Thirty-Seventh Association for the Advancement of Artificial Intelligence Conference on Artificial Intelligence, vol. 37, No. 11, Jun. 26, 2023, 11 pages.
Pradeep et al., "Squeezing Water from a Stone: A Bag of Tricks for Further Improving Cross-Encoder Effectiveness for Reranking", Forty-Fourth European Conference on Information Retrieval, Stavanger, Norway, Apr. 10-14, 2022, 16 pages.
Siriwardhana et al., "Improving the Domain Adaptation of Retrieval Augmented Generation (RAG) Models for Open Domain Question Answering", arXiv:2210.02627v1, Oct. 6, 2022, 15 pages.
Tan et al., "Can ChatGPT Replace Traditional KBQA Models? An In-Depth Analysis of The Question Answering Performance of The Gpt LLM Family", arXiv:2303.07992v3, Sep. 20, 2023, 20 pages.
Touvron et al., "LLaMA: Open and Efficient Foundation Language Models", arXiv:2302.13971v1, Feb. 27, 2023, 27 pages.
Veličković et al., "Graph Attention Networks", arXiv:1710.10903v3, Feb. 4, 2018, 12 pages.
Voorhees et al., "The TREC-8 Question Answering Track", Second International Conference on Language Resources and Evaluation (LREC'00), Athens, Greece, May 31-Jun. 2, 2000, 8 pages.
Wang et al., "Evaluating Open-QA Evaluation", arXiv:2305.12421v4, Oct. 23, 2023, 28 pages.
Wang et al., "Exploiting Abstract Meaning Representation for Open-Domain Question Answering", arXiv:2305.17050v1, May 26, 2023, 12 pages.
Wolf et al., "HuggingFace's Transformers: State-of-the-Art Natural Language Processing", arXiv:1910.03771v5, Jul. 14, 2020, 8 pages.
Xiao et al., "C-Pack: Packaged Resources to Advance General Chinese Embedding", arXiv:2309.07597v4, May 12, 2024, 9 pages.
Xiao et al., "RetroMAE: Pre-Training Retrieval-Oriented Transformers Via Masked Auto-Encoder", arXiv:2205.12035v2, Oct. 17, 2022, 11 pages.
Xu et al., "How Powerful are Graph Neural Networks?" arXiv:1810.00826v3, Feb. 22, 2019, 17 pages.
Yu et al., "KG-FiD: Infusing Knowledge Graph in Fusion-In-Decoder for Open-Domain Question Answering", arXiv:2110.04330v2, Jun. 6, 2022, 14 pages.
Zhuang et al., "RankT5: Fine-Tuning T5 for Text Ranking with Ranking Losses", arXiv:2210.10634v1, Oct. 12, 2022, 13 pages.
Gangemi et al., "Text2AMR2FRED, a Tool for Transforming Text into RDF/OWL Knowledge Graphs via Abstract Meaning Representation" ISWC 2023 Posters and Demos: 22nd International Semantic Web Conference, Nov. 6-10, 2023, Athens, Greece, 5 pages.
International Search Report and Written Opinion for Application No. PCT/US2025/025729, mailed Jul. 18, 2025, 14 pages.
Liao et al., "Abstract Meaning Representation for Multi-Document Summarization", Proceedings of the 27th International Conference on Computational Linguistics, Aug. 20-26, 2018, Santa Fe, New Mexico, USA, 13 pages.
Pramanik et al., "UNIQORN: Unified Question Answering over RDF Knowledge Graphs and Natural Language Text", Journal of Web Semantics, 27 pages.

\* cited by examiner

5100

---

1ST: SINATRA IN 1998, FOR EXAMPLE. THE BUILDING WAS BATHED IN BLUE LIGHT TO REPRESENT THE SINGER'S NICKNAME "OL' BLUE EYES". AFTER ACTRESS FAY WRAY, WHO STARRED IN "KING KONG", DIED IN SEPTEMBER 2004, THE BUILDING LIGHTS WERE EXTINGUISHED FOR 15 MINUTES. THE FLOODLIGHTS BATHED THE BUILDING IN RED, WHITE, AND BLUE FOR SEVERAL MONTHS AFTER THE DESCTRUCTION OF THE WORLD TRADE CENTER IN SEPTEMBER 2001, THEN REVERTED TO THE STANDARD SCHEDULE. ON JUNE 4, 2002, THE EMPIRE STATE BUILDING DONNED PURPLE AND GOLD (THE ROYAL COLORS OF ELIZABETH II), IN THANKS FOR THE UNITED KINGDOM PLAYING THE STAR SPANGLED BANNER

---

AMR GRAPH INFORMATION: #NODES: 51, #EDGES 82, # SSSP: 32
SCORE BY PALM 2: 50/100, RANK BY PALM 2: 9/100
RANK BY DPR: 5/100

---

2ND: AND ACTIVELY CAMPAIGNED FOR PRESIDENTS SUCH AS HARRY S. TRUMAN, JOHN F. KENNEDY AND RONALD REAGAN. IN CRIME, THE FBI INVESTIGATED SINATRA AND HIS ALLEGED RELATIONSHIP WITH THE MAFIA. WHILE SINATRA NEVER LEARNED HOW TO READ MSIC, HE HAD AN IMPRESSIVE UNDERSTANDING OF IT, AND HE WORKED VERY HARD FROM A YOUNG AGE TO IMPROVE HIS ABILLITIES IN ALL ASPECTS OF MUSIC. A PERFECTIONIST, RENOWNED FOR HIS DRESS SENSE AND PERFORMING PRESENCE, HE ALWAYS INSISTED ON RECORDING LIVE WITH HIS BAND. HIS BRIGHT BLUE EYES EARNED HIM THE POPULAR NICKNAME "OL' BLUE EYES". SINATRA LED A COLORFUL PERSONAL LIFE AND

---

AMR GRAPH INFORMATION: #NODES: 53, #EDGES 75, # SSSP: 34
SCORE BY PALM 2: 100/100, RANK BY PALM 2: 9/100
RANK BY DPR: 1/100

3RD: CLAIMED THAT SINATRA HAD GROWN "TIRED OF ENTERTAINING PEOPLE, ESPECIALLY WHEN ALL THEY REALLY WANTED WERE THE SAME OLD TUNES HE HAD LONG AGO BECOME BORED BY". WHILE HE WAS IN RETIREMENT, PRESIDENT RICHARD NIXON ASKED HIM TO PERFORM AT A YOUNG VOTERS RALLY IN ANTICIPATION OF THE UPCOMING CAMPAIGN. SINATRA OBLIGED AND CHOSE TO SING "MY KIND OF TOWN" FOR THE RALLY HELD IN CHICAGO ON OCTOBER 20, 1972. IN 1973, SINATRA CAME OUT OF HIS SHORT-LIVED RETIREMENT WITH A TELEVISION SPECIAL AND ALBUM. THE ALBUM, ENTITLED "OL' BLUE EYES IS BACK", ARRANGED BY GORDON JENKINS AND DON COSTA,

---

AMR GRAPH INFORMATION: #NODES: 52, #EDGES 85, # SSSP: 19
SCORE BY PALM 2: 20/100, RANK BY PALM 2: 27/100
RANK BY DPR: 8/100

---

4TH: STATE POLICE WOULD ATTEND, SEARCHING FOR ORGANIZED CRIME MEMBERS IN THE AUDIENCE. DURING A 1979 APPEARANCE IN PROVIDENCE, MAYOR BUDDY CIANCI NAMED SINATRA AN HONORARY FIRE CHIEF, COMPLETE WITH A HELMET BEARING THE NAME "F. SINATRA" WITH NICKNAME "OL' BLUE EYES" BENEATH. DAVID BOWIE'S CONCERT ON MAY 5, 1978 WAS ONE OF THREE RECORDED FOR HIS LIVE ALBUM "STAGE". THE BEE GEES PERFORMED TWO SOLD-OUT CONERTS HERE ON AUGUST 28-29, 1979 AS PART OF THEIR SPIRITS HAVING FLOWN TOUR. THE KINKS RECORDED MUCH OF THEIR LIVE ALBUM AND VIDEO, "ONE FOR THE ROAD" AT THE CIVIC CENTER SEPTEMBER 23, 1979

---

AMR GRAPH INFORMATION: #NODES: 54, #EDGES 67, # SSSP: 0
SCORE BY PALM 2: 50/100, RANK BY PALM 2: 9/100
RANK BY DPR: 6/100

---

5TH: ILLNESS). PASETTA WAS THE PRODUCER OF THE ELVIS PRESLEY CONCERT SPECIAL, "ALOHA FROM HAWAII VIA SATELLITE" IN JANUARY 1973. THE SHOW STILL HOLDS THE RECORD FOR THE MOST WATCHED TELEVISION SPECIAL IN HISTORY; VIEWING FIGURES ARE BETWEEN 1 AND 1.5 BILLION LIVE VIEWERS WORLDWIDE. 1973 ALSO SAW PASETTA DIRECT "MAGNAVOX PRESENTS FRANK SINATRA" (ALSO KNOWN AS "OL' BLUE EYES IS BACK"), THE TELEVISION SPECIAL THAT MARKED FRANK SINATRA'S COMEBACK FROM RETIREMENT. PASETTA DIED IN A 2015 SINGLE-CAR ACCIDENT. THE VEHICLE DRIVEN BY KEITH STEWART COLLIDED WITH PASETT SHORTLY AFTER STEWART HAD ALLOWED HIS PASSENGERS TO DISEMBARK. MARTY PASETTA MARTIN ALLEN

---

AMR GRAPH INFORMATION: #NODES: 39, #EDGES 59, # SSSP: 39
SCORE BY PALM 2: 50/100, RANK BY PALM 2: 9/100
RANK BY DPR: 3/100

6TH: HIM FEEL WEALTHY AND IMPORTANT, AND THAT HE WAS GIVING HIS VERY BEST TO THE AUDIENCE. HE WAS ALSO OBSESSED WITH CLEANLINESS - WHILE WITH THE TOMMY DORSEY BAND HE DEVELOPED THE NICKNAME "LADY MACBETH", BECAUSE OF THE FREQUENT SHOWERING AND SWITCHING HIS OUTFITS. HIS DEEP BLUE EYES EARNED HIM THE POPULAR NICKNAME "OL' BLUE EYES". FOR SANTOPIETRO, SINATRA WAS THE PERSONIFICATION OF AMERICA IN THE 1950S: "COCKY, EYE ON THE MAIN CHANCE, OPTIMISTIC, AND FULL OF THE SENSE OF POSSIBILITY". BARBARA SINATRA WROTE, "A BIG PART OF FRANK'S THRILL WAS THE SENSE OF DANGER THAT HE EXUDED, AN UNDERRLYING EVER-PRESENT TENSION ONLY

AMR GRAPH INFORMATION: #NODES: 44, #EDGES 81 # SSSP: 30
SCORE BY PALM 2: 100/100, RANK BY PALM 2: 1/100
RANK BY DPR: 2/100

7TH: WHERE HIS SUITE AND THOSE OF HIS ENTOURAGE WERE ON THE 23RD FLOOR. HIS TOUR, HIS FIRST IN AUSTRALIA IN 15 YEARS AND BILLED AS "OL' BLUE EYES IS BACK," WAS SCHEDULED TO INCLUDE TWO SHOWS IN MELBOURNE, FOLLOWED BY THREE IN SYDNEY. IN HIS FIRST SHOW, ACCORDING TO NEWS REPORTS FROM 1974, SINATRA REFERRED ON STAGE TO THE MEDIA AS "PARASITES" AND "BUMS" AND TO WOMEN SPECIFICALLY AS "THE BROADS OF THE PRESS, THE HOOKERS OF THE PRESS," THEN ADDING, "I MIGHT OFFER THEM A BUCK AND A HALF, I'M NOT SURE." THE CHARACTER OF ROD BLUE IN THE

AMR GRAPH INFORMATION: #NODES: 32, #EDGES 61 # SSSP: 32
SCORE BY PALM 2: 50/100, RANK BY PALM 2: 9/100
RANK BY DPR: 11/100

8TH: RLPO, BBC CONCERT ORCHESTRA (FOR "FRIDAY NIGHT IS MUSIC NIGHT") LAHTI SYMPHONY ORCHESTRA, NORTHERN SINFONIA, THE MELBOURNE SYMPHONY ORCHESTRA, THE ADELAIDE SYPHONE ORCHESTRA FOR THE ADELAIDGE CABARET FESTIVAL AND THE RTE CONCERT ORCHESTRA. HIS MOST POPULAR SHOW IS THE INTERACTIVE "SINATRA JUKEBOX" WHERE, "INSTEAD OF AN HOUR OF SONGS AND ANECDOTE, HALFWAY THROUGH MEMBERS OF THE AUDIENCE WERE INVITED TO FILL IN REQUEST FORMS". REVIEWING THE SHOW, "CABARET SCENES" SAID, "I CAN THINK OF NO OTHER SINGER TO BETTER PAY HOMAGE TO OL' BLUE EYES ON HIS 100TH BIRTHDAY". IN 2014 HE PERFORMED ON BBC RADIO 2 WITH THE BBC

AMR GRAPH INFORMATION: #NODES: 51, #EDGES 57 # SSSP: 20
SCORE BY PALM 2: 20/100, RANK BY PALM 2: 27/100
RANK BY DPR: 14/100

9TH: AS HIS TRIBUTE TO "THE GREAT AMERICAN SONGBOOK". THE ALBUM HAS OLEG'S VOCALS AND ARRANGEMENTS BY A BIG BAND LEADER PATRICK WILLIAMS (A LATE PERIOD FRANK SINATRA RECORDING ASSOCIATE) AND SOUND ENGINEERING BY AL SCHMIDT, WHOSE 60-YEAR OLD CAREER YIELDED 50 GOLD AND PLATINUM ALBUMS, 20 GRAMMY AWARDS AND WHO ALSO RECORDED OL' BLUE EYES. "BRING ME SUNSHINE" WAS PRODUCED AT THE LEGENDARY CAPITOL RECORDS STUDIOS IN HOLLYWOOD, CA. SONGWRITER, CHARLES STROUSE QUOTED: "THE GREAT AMERICAN SONGBOOK, TO WHICH I AM PROUD TO BE A CONTRIBUTOR, IS ONE OF OUR GREATEST CULTURAL EXPORTS, OLEG IS A LIVING EXAMPLE OF WHAT AN

AMR GRAPH INFORMATION: #NODES: 52, #EDGES 68 # SSSP: 12
SCORE BY PALM 2: 50/100, RANK BY PALM 2: 9/100
RANK BY DPR: 27/100

10TH: FIRST PLACE WINS THE FOUNDING DIRECTOR IS BEN FERRIS (2004+). SYDNEY FILM SCHOOL RUNS TWO COURSES: THE DIPLOMA OF SCREEN & MEDIA AND THE ADVANCED DIPLOMA OF SCREEN & MEDIA. SOME OF THE ACCOLADES AFFORDED TO SYDNEY FILM SCHOOL GRADUATES FOR THEIR WORK INCLUDE: BEST STUDENT DOCUMENTARY FILM AT ANTENNA FILM FESTIVAL: "OL' BLUE EYES", MATT COONEY FINALIST AT BONDI SHORT FILM FESTIVAL: "LETTERS HOME", NEILESH VERMA INDUSTRY ADVISORY BOARD (IAB) PITCH COMPETITION WINNER: "LOTUS SONNY". GARY SOFARELLI OPENING NIGHT SCREENING; BEST AUSTRALIAN ANIMATION & BEST AUSTRALIAN COMPOSER AT WORLD OF WOMAN WOW FILM FESTIVAL, 2012: "CAMERA OBSCURA", MARTA MAIA

AMR GRAPH INFORMATION: #NODES: 58, #EDGES 69 # SSSP: 35
SCORE BY PALM 2: 0/100, RANK BY PALM 2: 30/100
RANK BY DPR: 39/100

RERANKING DOCUMENTS BASED ON GRAPH REPRESENTATIONS OF THE DOCUMENTS

FIELD

The disclosure relates to computing systems and methods for reranking a plurality of documents which are retrieved in response to a computing system receiving a query (e.g., a question). In particular, computing systems and methods described herein can implement a ranking system including a first graph representation (e.g., an abstract meaning representation (AMR) graph) and a second graph representation (e.g., a document graph) which combine both connections between the documents and semantic information to provide a context-informed ranker.

BACKGROUND

Some methods of retrieval augmented generation (RAG) in Open-Domain Question Answering (ODQA) combine information retrieval (e.g., via dense passage retrieval (DPR)), and a reading process in a differentiable manner for ODQA. The reading process may be implemented by a reader having a neural network which receives ranked documents and generates the answer from the content included in the ranked documents. Some methods exist for developing rerankers for further improving RAG (e.g., approaches including monoT5, monoELECTRA, fine-tuned versions of T5, reranker modules in which a reader's neural network is fine-tuned through a prompting method, etc.).

Some methods leverage knowledge graphs in ODQA. Knowledge graphs represent entities and their relations. Some methods use abstract meaning representation (AMR) graphs generated from questions and documents to construct embeddings to determine text-level relations within a single document.

Some methods integrate AMR graphs into learning models and have applied AMR to ODQA to deal with complex semantic information. However, those methods increase the computational time and computational (e.g., GPU) memory cost.

Large language models (LLMs) such as Chat-GPT, PaLM 2, LLaMA, and GPT4, have been used to provide answers to a broad range of questions due to their vast knowledge repositories and chain-of-thought reasoning capability. Some methods implement LLMs to improve RAG in ODQA.

SUMMARY

Aspects and advantages of embodiments of the disclosure will be set forth in part in the following description, or can be learned from the description, or can be learned through practice of the embodiments.

One example aspect of the disclosure is directed to a computer-implemented method for answering a query by reranking documents retrieved in response to receiving the query. The method includes in response to receiving a query, retrieving, by a computing system comprising one or more processors, a plurality of documents; generating, by the computing system, a first graph representation which graphically represents the plurality of documents utilizing a plurality of nodes indicating a concept and a plurality of edges indicating a relationship between at least two nodes among the plurality of nodes; generating, by the computing system, a second graph representation with respect to the plurality of documents, based on connection information associated with the first graph representation; ranking, by the computing system, the plurality of documents, based on the second graph representation; and applying, by the computing system, one or more first machine-learned models, to generate a response to the query based on the plurality of documents ranked based on the second graph representation.

In some implementations, the first graph representation includes an abstract meaning representation (AMR) graph, and the second graph representation includes a document graph generated based on AMR connection information.

In some implementations, generating the second graph representation including the document graph comprises removing isolated nodes from the document graph.

In some implementations, generating the second graph representation comprises generating document embeddings for the plurality of documents by encoding a concatenation of each document with the AMR connection information.

In some implementations, the AMR connection information includes one or more single source shortest paths from a first node among the plurality of nodes to one or more other nodes among the plurality of nodes.

In some implementations, the first node is a question node, and each of the one or more single source shortest paths start from the question node.

In some implementations, the method includes applying one or more second machine-learned models to update the second graph representation for each of a plurality of layers of the one or more second machine-learned models by applying a function that aggregates a representation of a first node from the document graph and one or more neighboring nodes of the first node from the document graph.

In some implementations, the one or more second machine-learned models include one or more graph neural networks.

In some implementations, the one or more graph neural networks include one or more 2-layer graph convolutional networks.

In some implementations, at least some of the documents from among the plurality of documents correspond to a passage from a text corpus, the passage having a predetermined length.

In some implementations, retrieving the plurality of documents comprises implementing a dense embedding-based passage retrieval model to extract the plurality of documents in an open-domain question answering environment.

In some implementations, ranking the plurality of documents is based on the second graph representation and a pairwise loss function.

Another example aspect of the disclosure is directed to a computing system for answering a query by reranking documents retrieved in response to receiving the query. The computing system includes one or more processors; and one or more non-transitory computer-readable media that store instructions that, when executed by the one or more processors, cause the computing system to perform operations, the operations comprising: in response to receiving a query, retrieving a plurality of documents; generating a first graph representation which graphically represents the plurality of documents utilizing a plurality of nodes indicating a concept and a plurality of edges indicating a relationship between at least two nodes among the plurality of nodes; generating a second graph representation with respect to the plurality of documents, based on connection information associated with the first graph representation; ranking the plurality of documents, based on the second graph representation; and applying one or more machine-learned models to generate a response to the query based on the plurality of documents ranked based on the second graph representation.

In some implementations, the first graph representation includes an abstract meaning representation (AMR) graph, and the second graph representation includes a document graph generated based on AMR connection information.

In some implementations, generating the second graph representation including the document graph comprises removing isolated nodes from the document graph.

In some implementations, generating the second graph representation comprises generating document embeddings for the plurality of documents by encoding a concatenation of each document with the AMR connection information.

In some implementations, the AMR connection information includes one or more single source shortest paths from a first node among the plurality of nodes to one or more other nodes among the plurality of nodes.

In some implementations, the operations further comprise: applying one or more second machine-learned models to update the second graph representation for each of a plurality of layers of the one or more second machine-learned models by applying a function that aggregates a representation of a first node from the document graph and one or more neighboring nodes of the first node from the document graph.

In some implementations, the one or more second machine-learned models include one or more graph neural networks, and the one or more graph neural networks include one or more 2-layer graph convolutional networks.

Other aspects of the disclosure are directed to various systems, apparatuses, non-transitory computer-readable media, user interfaces, and electronic devices. In one or more example embodiments, a computer-readable medium (e.g., a non-transitory computer-readable medium) which stores instructions that are executable by one or more processors of a computing system or computing device is provided. In some implementations the computer-readable medium stores instructions which may include instructions to cause the one or more processors to perform one or more operations of any of the methods described herein (e.g., operations of the computing system or of the computing device). For example, the operations may include in response to receiving a query, retrieving a plurality of documents; generating a first graph representation which graphically represents the plurality of documents utilizing a plurality of nodes indicating a concept and a plurality of edges indicating a relationship between at least two nodes among the plurality of nodes; generating a second graph representation with respect to the plurality of documents, based on connection information associated with the first graph representation; ranking the plurality of documents, based on the second graph representation; and applying one or more machine-learned models to generate a response to the query based on the plurality of documents ranked based on the second graph representation. The computer-readable medium may store additional instructions to execute other aspects of the computing system or of the computing device and corresponding methods of operation, as described herein.

These and other features, aspects, and advantages of various embodiments of the disclosure will become better understood with reference to the following description and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended drawings, in which:

FIGS. 5A-5B depict example results of the reranking system described herein, according to examples of the disclosure.

Figure 1A:
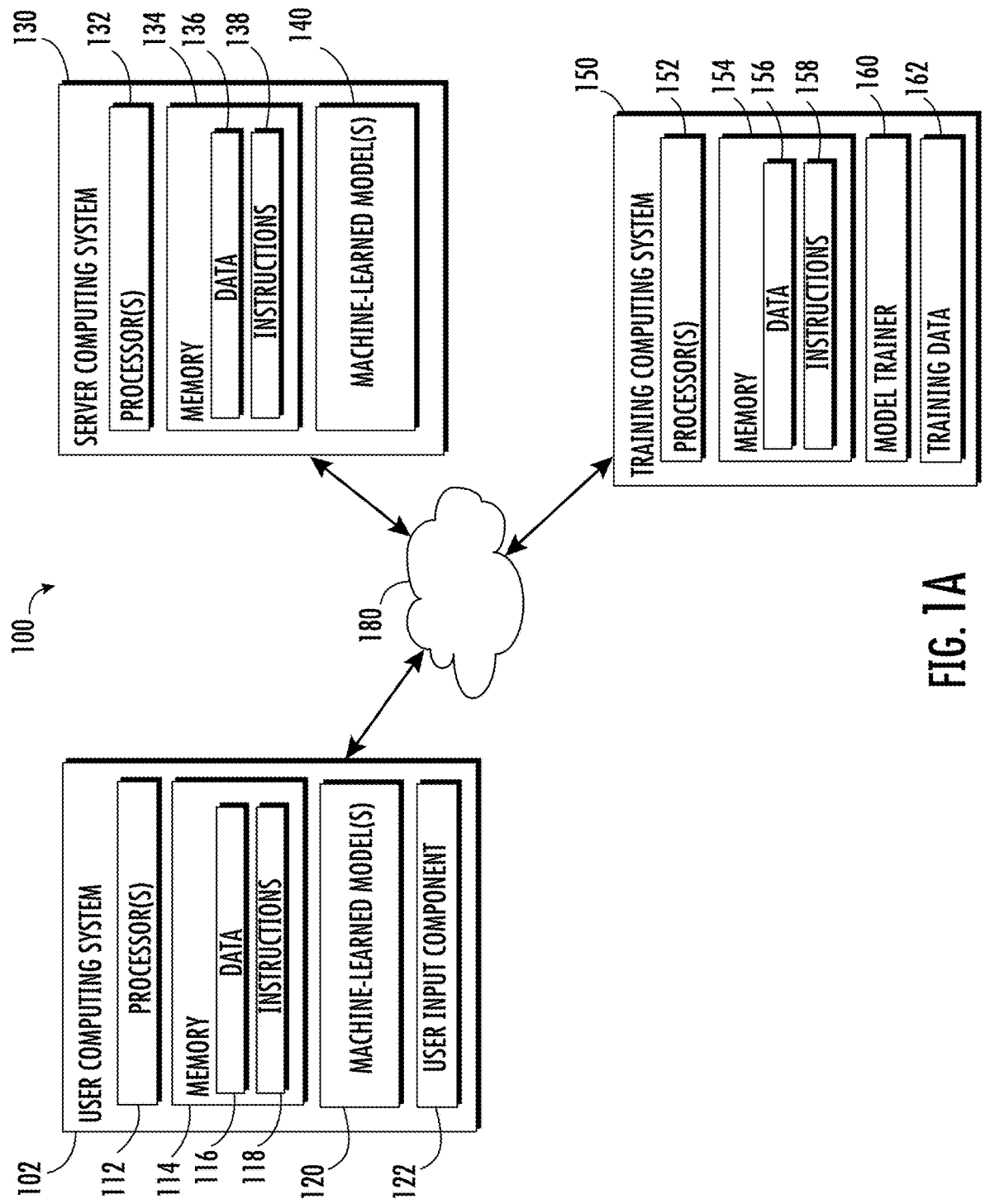
FIG. 1A depicts a block diagram of an example computing system that performs various tasks using a machine-learned model, according to example embodiments of the disclosure.

Reference numerals that are repeated across plural drawings are intended to identify the same features in various implementations.

DETAILED DESCRIPTION

Overview

Reference now will be made to embodiments of the disclosure, one or more examples of which are illustrated in the drawings, wherein like reference characters across drawings are intended to denote like features in various implementations. Each example is provided by way of explanation of the disclosure and is not intended to limit the disclosure.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

It will be understood that when an element is referred to as being "connected" to another element, the expression encompasses an example of a direct connection or direct coupling, as well as a connection or coupling with one or more other elements interposed therebetween.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Retrieval Augmented Generation (RAG) has greatly improved the performance of Large Language Model (LLM) responses by grounding generation with context from existing documents. RAG has brought improvements to many problems in text generation including in the context of Open-Domain Question Answering (ODQA) which involves answering natural language questions without limiting the domain of the answers. RAG merges the retrieval and answering processes, which improves the ability to effectively collect knowledge, extract useful information, and generate answers. Even though it is successful in fetching relevant documents, RAG is not able to utilize connections between documents and may not work well when a document has partial information, or less obvious connections to the context. In the ODQA setting, this leads to the model disregarding documents containing answers, also known as positive documents, with less apparent connections to the question context. According to examples of the disclosure described herein, the reranking method can identify documents with less apparent connections by connecting them with positive documents which have a context that is strongly relevant to the question context.

According to examples of the disclosure described herein, a reranking method which is based on graph neural networks (GNNs) is provided between a retriever and a reader in RAG. As described herein, the retriever may be configured to retrieve relevant documents based on an initial prompt (question) and the reader may be a system (including one or more machine-learned models) configured to generate a response (answer) to the prompt (question) based on content included in the retrieved documents. In some implementations, the retrieved documents can be reranked by a reranker and the reader may be a system (including one or more machine-learned models) configured to generate a response (answer) to the prompt (question) based on content included in the reranked documents. The disclosed reranking method combines both connections between documents and semantic information (via abstract meaning representation graphs) to provide a context-informed ranker for RAG. The disclosed reranking system described herein can outperform current approaches (e.g., PaLM 2) while having a smaller computational footprint.

To find connections between documents and select highly relevant ones, the reranking process plays a vital role in further effectively filtering retrieved documents. A powerful reranker also reduces the complexity of the reading process (performed by the reader which generates an answer from content in the retrieved and reranked documents) if it can successfully identify positive documents. Thus, examples of the disclosure are directed to computing systems and methods which implement a reranking method that can improve RAG, as reranking is a fundamental bridge between the retrieval and reading processes.

Existing methods do not investigate connections between documents and do not utilize this information during a reranking process. Therefore, existing methods fail to identify documents containing "gold answers" that may not exhibit obvious connections to the question context. According to the computing systems and methods disclosed herein document graphs are constructed and can identify valuable information contained in a document based on whether neighboring document nodes in the graph share similar information.

Knowledge graph-based methods require large external knowledge bases and entity mapping from documents to the entities in the knowledge graph, which increase the memory cost for knowledge graph storage. However, the computing systems and methods disclosed herein do not depend on external knowledge graphs. Further, in contrast with approaches which examine relations in a single document, the computing systems and methods disclosed herein uniquely leverage document graphs to characterize cross-document connections, within the RAG reranking process.

Pre-trained language models (LMs) like BERT, ROBERTa, and BART have been used to enhance reranking performance by estimating the relevant score between questions and documents. Recently, an abstract meaning representation (AMR) graph has been integrated with a LM to enhance the system's ability to comprehend complex semantics. In the AMR graph, nodes represent basic semantic units like entities and concepts, while edges denote the connections between them. AMR graphs have more structured semantic information compared to the general form of natural language. However, certain limitations persist in these implementations. First, as mentioned above, most of the current approaches fail to capture important connections between different retrieved documents. The current approaches do not consider the connection between documents in the reranking process. Further, even though the AMR graph can be used to help understand complex semantics, current methods integrate redundant AMR information into the pre-trained language models which can cause potential overfitting, in addition to increases in computational time and computational (e.g., GPU) cost. Also, methods which implement AMR integrate all tokens of the AMR nodes and edges without conscientiously selecting the key factors resulting in increased computational time and computational (e.g., GPU) memory cost.

According to examples of the disclosure, computing systems and methods described herein are configured to construct document graphs, where each node in a document graph represents a document, and each edge represents that there are common concepts between two documents. When a document in the document graph shares similar information with its neighbor nodes, it helps the reranker to successfully identify the documents containing answer context that is only weakly connected to the question. The computing systems and methods described herein incorporate the connection information between different documents into the edge features and update the edge features through a message-passing mechanism. For node features, the computing systems and methods described herein selectively encode information as node-level features. For example, rather than add all AMR-related tokens as node-level features (which would increase consumption of computing resources and latency), the computing systems and methods described herein identify one or more factors that the reranker relies upon to identify more relevant documents and encodes those one or more factors to node features.

Examples of the disclosure also describe improved metrics to assess a wide range of ranking scenarios, including those with tied ranking scores. Based on the improved metrics, the disclosed computing systems and methods outperform current methods and require fewer computational resources.

With reference now to the drawings, example embodiments of the disclosure will be discussed in further detail.

Example Devices and Systems

FIG. 1A depicts a block diagram of an example computing system 100 that performs various tasks using one or more machine-learned models according to example embodiments of the disclosure. The computing system 100 includes a user computing system 102, a server computing system 130, and a training computing system 150 that are communicatively coupled over a network 180.

The user computing system 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the one or more machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to the drawings herein.

In some implementations, the one or more machine-learned models 120 can be received from the server computing system 130 over network 180, stored in the memory 114, and then used or otherwise implemented by the one or more processors 112. In some implementations, the user computing system 102 can implement multiple parallel instances of a single machine-learned model 120 (e.g., to perform parallel tasks across multiple instances of the machine-learned model 120).

More particularly, one or more machine-learned models disclosed herein may be implemented to perform various tasks related to processing a query (e.g., a question) input to a computing system. According to examples of the disclosure, a computing system may be configured to, in response to receiving a query, retrieve a plurality of documents (e.g., via one or more machine-learned models). The computing system may be further configured to generate a first graph representation which graphically represents the plurality of documents utilizing a plurality of nodes indicating a concept and a plurality of edges indicating a relationship between at least two nodes among the plurality of nodes. The computing system may be further configured to generate a second graph representation with respect to the plurality of documents, based on connection information associated with the first graph representation. The computing system may be further configured to rank the plurality of documents, based on the second graph representation, and applying one or more machine-learned models to generate a response to the query based on the plurality of documents ranked based on the second graph representation.

One or more machine-learned models described herein may be configured to retrieve a plurality of documents in response to receiving a query (e.g., a question). One or more machine-learned models described herein may be configured to generate an abstract meaning representation (AMR) graph by parsing each of the documents retrieved in response to the query. One or more machine-learned models (e.g., a graph neural network) described herein may be configured to rerank the plurality of documents based on a document graph generated based on the AMR graph. One or more machine-learned models described herein may be configured to generate or provide a response (an answer) to the query by extracting content from the reranked documents.

Additionally, or alternatively, the one or more machine-learned models 140 can be included in or otherwise stored and implemented by the server computing system 130 that communicates with the user computing system 102 according to a client-server relationship. For example, the one or more machine-learned models 140 can be implemented by the server computing system 130 as a portion of a web service (e.g., a recommendation service, a search service, an image analysis service, and the like). Thus, the one or more machine-learned models 120 can be stored and implemented at the user computing system 102 and/or the one or more machine-learned models 140 can be stored and implemented at the server computing system 130.

The user computing system 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, a mouse, or other devices by which a user can provide user input (e.g., a camera which captures an image).

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the one or more machine-learned models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example machine-learned models 140 are discussed herein with reference to the drawings.

The user computing system 102 and/or the server computing system 130 can train the one or more machine-learned models 120 and/or the one or more machine-learned models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the one or more machine-learned models 120 and/or the one or more machine-learned models 140 stored at the user computing system 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the one or more machine-learned models 120 and/or the one or more machine-learned models 140 based on a set of training data 162. The training data 162 can include, for example, various datasets which may be stored remotely or at the training computing system 150. For example, in some implementations an example dataset utilized for training includes one or more ODQA datasets (e.g., Natural Questions (NQ) dataset, TriviaQA dataset, etc.). However, other datasets of images may be utilized (e.g., other ODQA datasets from external websites). In some implementations, the dataset may be confined to a particular category, genre, etc. In some implementations, the dataset may contain diverse subject matter which is not limited to a particular category, genre, etc.

In some implementations, if the user has provided consent, the training examples can be provided by the user computing system 102. Thus, in such implementations, the one or more machine-learned models 120 provided to the user computing system 102 can be trained by the training computing system 150 on user-specific data received from the user computing system 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases. In some implementations, the input to the machine-learned model(s) of the disclosure can be a query (e.g., a question). The machine-learned model(s) can process the question based on a plurality of documents which are retrieved and ranked to generate an output.

FIG. 1A illustrates an example computing system that can be used to implement aspects of the disclosure. Other computing systems can be used as well. For example, in some implementations, the user computing system 102 can include the model trainer 160 and the training data 162. In such implementations, the one or more machine-learned models 120 can be both trained and used locally at the user computing system 102. In some of such implementations, the user computing system 102 can implement the model trainer 160 to personalize the machine-learned models 120 based on user-specific data.

Figure 1B:
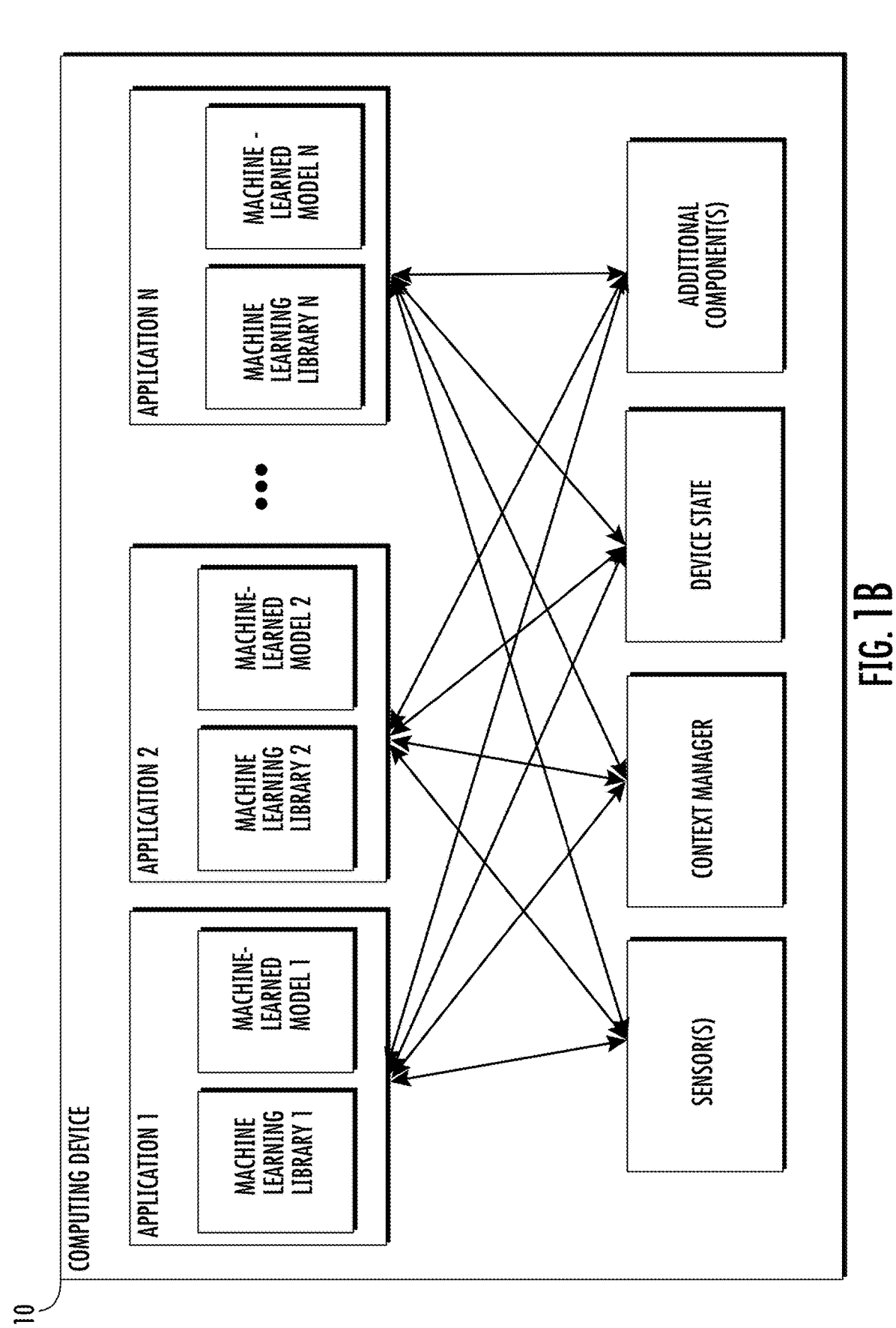
FIG. 1B depicts a block diagram of an example computing device that performs various tasks using a machine-learned model, according to example embodiments of the disclosure.

FIG. 1B depicts a block diagram of an example computing device 10 that performs according to example embodiments of the disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a social media application, an infotainment application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
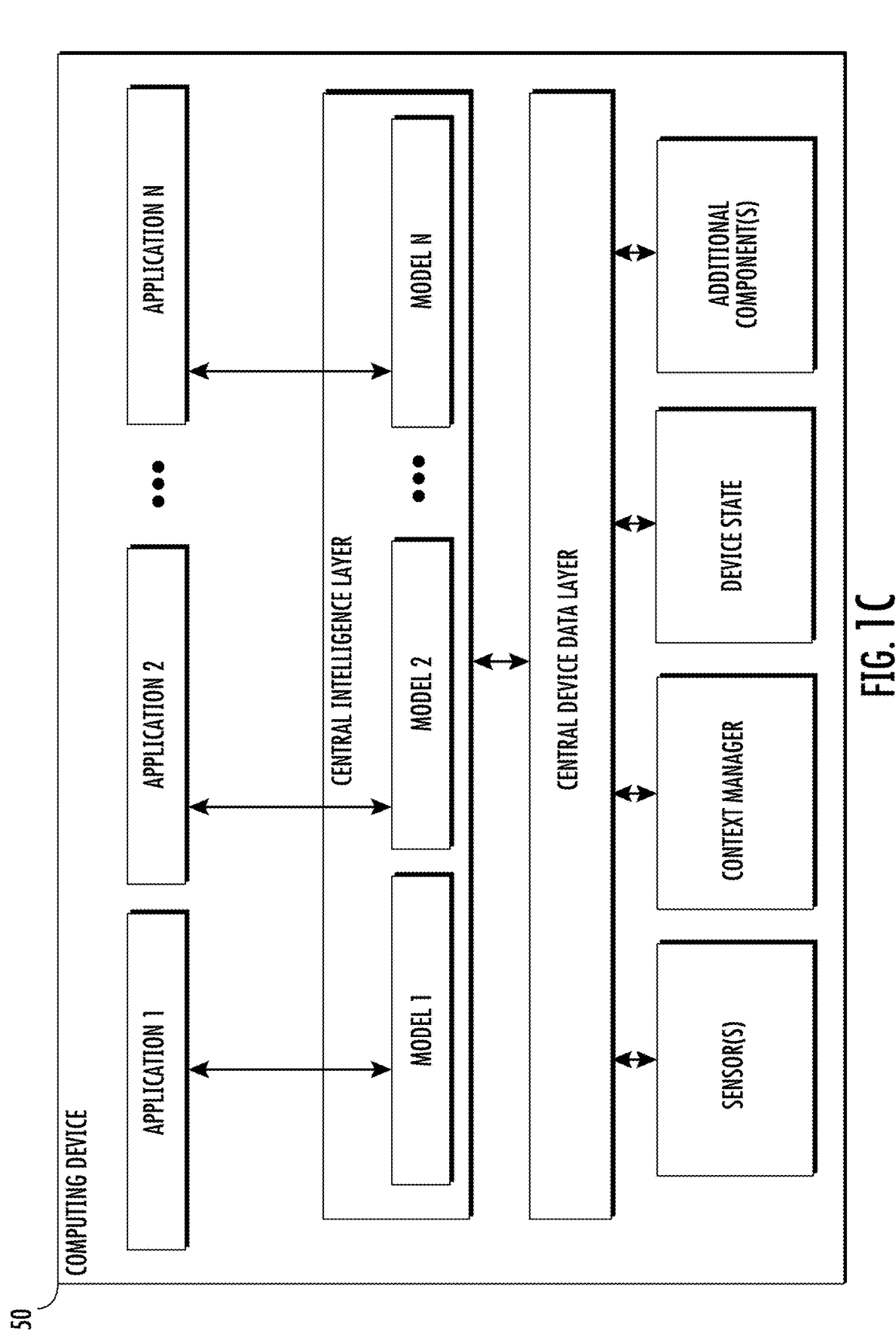
FIG. 1C depicts a block diagram of an example computing device that performs various tasks using a machine-learned model, according to example embodiments of the disclosure.

FIG. 1C depicts a block diagram of an example computing device 50 that performs according to example embodiments of the disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a social media application, an infotainment application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2A:
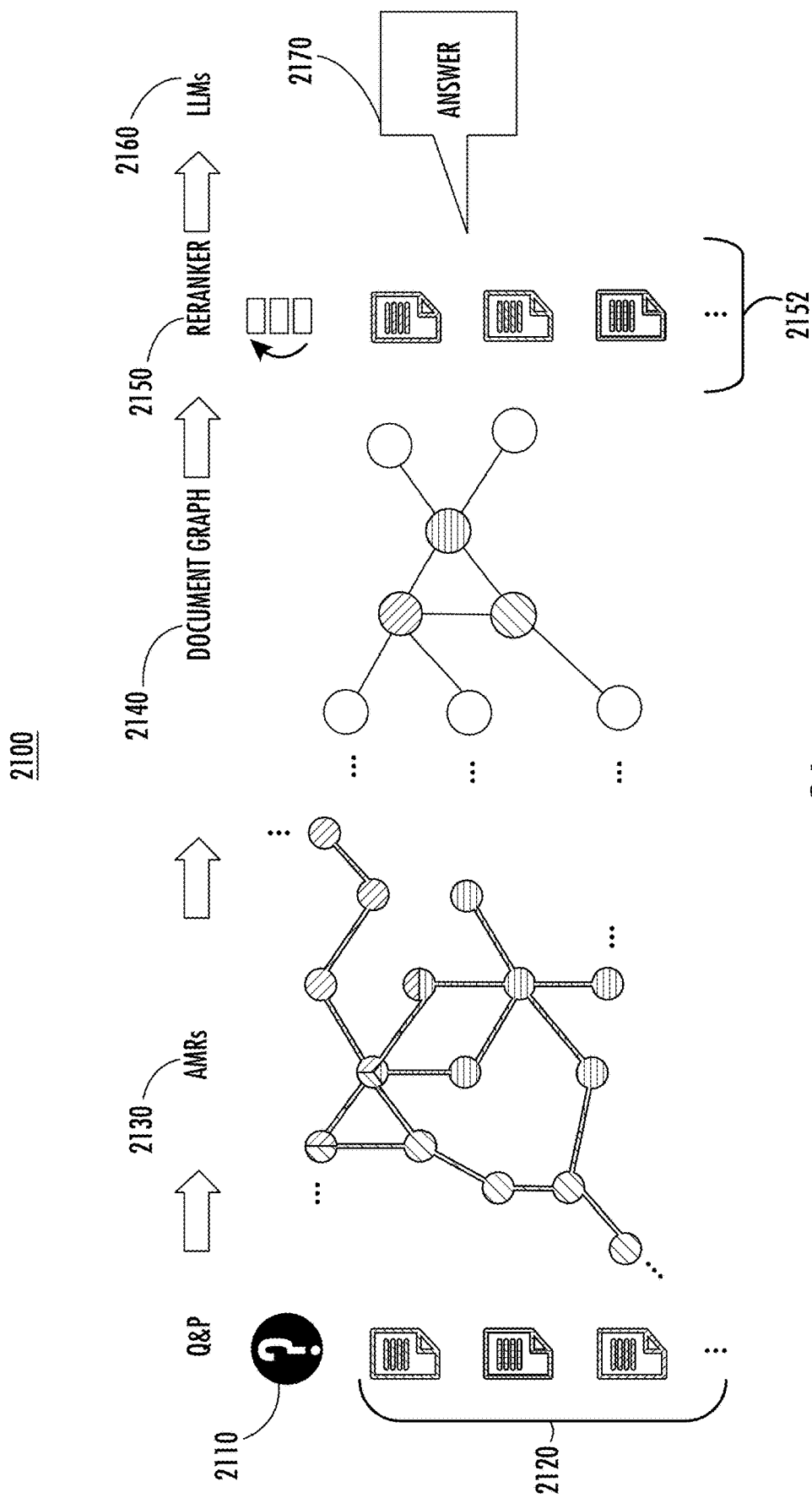
FIGS. 2A-2B depict example systems for reranking documents retrieved in response to receiving a query, according to example embodiments of the disclosure.
Figure 2B:
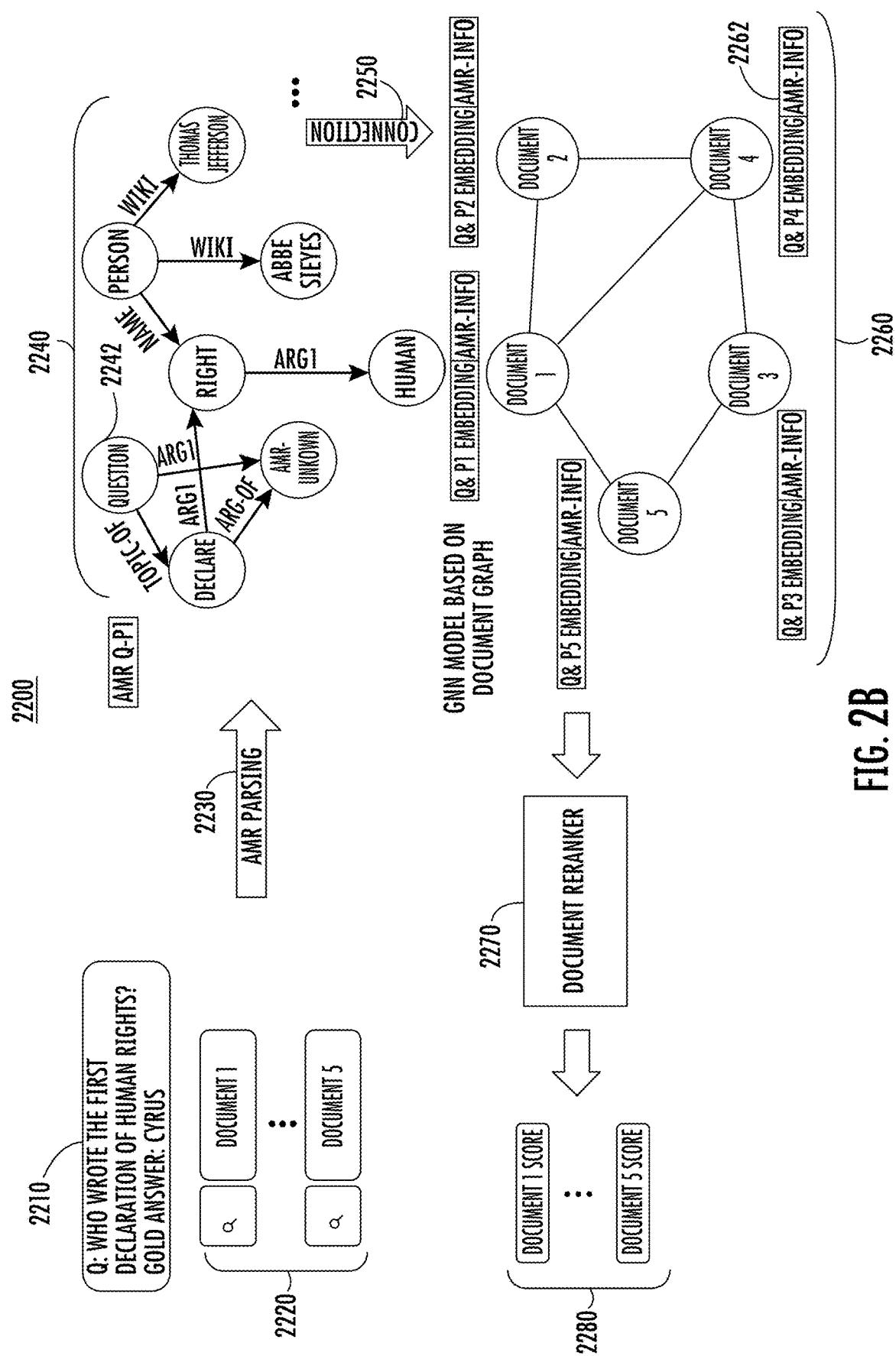

FIGS. 2A-2B depict example systems for reranking documents retrieved in response to receiving a query, according to example embodiments of the disclosure.

The example system 2100 of FIG. 2A may be implemented by one or more of user computing system 102, server computing system 130, or training computing system 150, or a combination thereof. Unless otherwise specified, references to a "computing system" herein refers to the user computing system 102 alone, server computing system 130 alone, training computing system 150 alone, or any combination thereof. Thus, each of the components of FIG. 2A can be included in user computing system 102 alone, server computing system 130 alone, training computing system 150 alone, or any combination thereof.

In the example system 2100 of FIG. 2A, the computing system receives an input query 2110 (e.g., a question) and outputs an answer 2170. The system 2100 may correspond to an open-domain question answering system which implements operations involving natural language processing (NLP), information retrieval, and machine learning to extract and synthesize information from diverse sources to generate responses to user queries.

For example, the system 2100 may include a document retriever configured to extract a set of documents from among a plurality of open-source documents for the given question. For example, the document retriever may be configured to implement a dense embedding-based passage retrieval (DPR) model to extract the set of documents. For example, the computing system may be configured to retrieve a plurality of documents 2120 in response to receiving the query. In some implementations, a document may correspond to a passage of a certain length (e.g., 50 words, 100 words, etc.) from a larger document. In some implementations, the DPR model can provide an initial ranking of the set of documents.

For example, the system 2100 may include a reranking system to filter (rerank) the set of documents by identifying and selecting top-ranking documents from the retrieved set of documents (e.g., the top 10 documents, the top 100 documents, etc.). The reranking system is effective when a ranked document includes a "gold answer" and the document may be referred to as a "positive" document. In FIG. 2A, the reranking system may include a first graph (e.g., an abstract meaning representation graph 2130), a second graph (e.g., a document graph 2140), and a reranker 2150 for document reranking to generate the reranked documents 2152. Details regarding these features are described herein.

For example, the system 2100 may include a reader which receives the reranked documents from the reranking system. As an example, the reader may include one or more machine-learned models (e.g., one or more large language models 2160). The reader can generate the answer 2170 from the content included in the reranked documents.

The example system 2200 of FIG. 2B may be implemented by one or more of user computing system 102, server computing system 130, or training computing system 150, or a combination thereof. Unless otherwise specified, references to a "computing system" herein refers to the user computing system 102 alone, server computing system 130 alone, training computing system 150 alone, or any combination thereof. Thus, each of the components of FIG. 2B can be included in user computing system 102 alone, server computing system 130 alone, training computing system 150 alone, or any combination thereof.

In the example system 2200 of FIG. 2B, the computing system receives an input query 2210 (e.g., a question such as "Who wrote the first declaration of human rights?") and outputs reranked documents 2280. The system 2200 may correspond to an open-domain question answering system.

For example, the system 2200 may include a document retriever configured to extract a set of documents from among a plurality of open-source documents for the given question. For example, the document retriever may be configured to implement a dense embedding-based passage retrieval (DPR) model to extract the set of documents. For example, the computing system may be configured to retrieve a plurality of documents 2120 (e.g., five documents) in response to receiving the query. In some implementations, a document may correspond to a passage of a certain length (e.g., 50 words, 100 words, etc.) from a larger document. In some implementations, the DPR model can provide an initial ranking of the plurality of documents.

For example, the system 2100 may include a reranking system to filter (rank) the set of documents 2220 by identifying and selecting top-ranking documents from the retrieved set of documents (e.g., the top 10 documents, the top 100 documents, etc.). The reranking system is effective when a ranked document includes a "gold answer" (e.g., "Cyrus" in the example of FIG. 2B) and the document may be referred to as a "positive" document. In FIG. 2B, the reranking system may include a first graph 2240 (e.g., an abstract meaning representation graph), a second graph 2260 (e.g., a document graph), and a reranker 2270 for document reranking to generate the reranked documents 2280.

For example, the computing system may be configured to generate (form) the first graph 2240 by concatenating the input (the question q) with a document p as "question: <question text><document text>" and then implement a sequence-to-sequence parser 2230 (e.g., AMRBART or other sequence-to-sequence AMR parser models), to parse the sequence into the first graph (e.g., an AMR graph). For example, the AMR graph, or Abstract Meaning Representation graph, may correspond to a linguistic representation used in natural language processing (NLP) to capture the meaning of a sentence in a structured and abstract form. In the AMR graph, a passage (e.g., a sentence or text of a certain length) may be represented as a directed acyclic graph (DAG), where nodes represent concepts or entities, and edges represent semantic relations between them. For example, an AMR graph for question q and document p among the plurality of documents may be denoted as $G_{qp}=\{V, E\}$, where V and E are nodes and edges, respectively. Each node may correspond to a concept or entity, and each edge may be denoted as $e=(s, r, d)$ where s, r, d represent the source node, relation, and the destination node, respectively.

For example, the computing system may be configured to generate (form) the second graph 2260 based on the AMR graphs for the plurality of documents 2120. For example, the computing system may be configured to generate (form) the second graph 2260 (e.g., the document graph) given one question q and documents $\{p_1, \ldots, p_n\}$ (e.g., with n=100). The second graph 2260 may be represented as $G_q=\{V, \varepsilon\}$ based on AMRs $\{G_{qp1}, \ldots, G_{qpn}\}$. For each node $v_i \in V$, it corresponds to the document $p_i$. For $v_i, v_j \in V$, $i \neq j$, if the corresponding AMR $G_{qpi}$ and $G_{qpj}$ have common nodes, there will be an undirected edge between $v_i$ and $v_j$ denoted as $e_{ij}=(v_i, v_j) \in \varepsilon$. For example, the computing system may be configured to incorporate connection information 2250 between different documents into the edge features and update the edge features through a message-passing mechanism.

The computing system may be configured to remove isolated nodes in $G_q$. For example, the computing system may include one or more machine-learned models (e.g., one or more neural networks, one or more graph neural networks, etc.) which are configured based on the document graphs to predict whether a document is relevant (or the degree of relevance or relative relevance).

In some implementations, the computing system may be configured to encode document texts as node features in a graph neural network. For example, the computing system may be configured to apply a pre-trained language model to encode all the n retrieved documents in $\{p_1, p_2, \ldots, p_n\}$ given a question q. For example, the document embedding may be denoted as $\dot{X} \in R^{n \times d}$ where d is the hidden dimension, and each row of X is given by $\dot{x}_i=\text{Encode}(p_i)$ for $i \in \{1, 2, \ldots, n\}$.

The computing system may be configured to concatenate document text and corresponding AMR information as the input of the encoder. Integrating all the information into the embedding process can result in high computational costs and may lead to overfitting. In some implementations, the computing system may be configured to embed documents in a particular manner based on one or more particular factors (e.g., shortest single source paths, shortest single source paths starting from a "question" node in the AMR graph, etc.) that facilitate the reranker in identifying more relevant documents. For example, the structure of AMRs for different documents may include the node "question" (e.g., question node 2242 in FIG. 2B), where the word "question" is included in the input of the AMR parsing model, given by "question: <question text><document text>". Thus, the computing system may utilize the single source shortest path starting from the node "question" when embedding the documents. For example, the computing system may be configured to analyze nodes covered in each path to collect both structural and semantic information to obtain connection information 2250. The computing system can be configured to utilize the document embedding to identify the similarity between the question and the document context.

Based on an analysis of data associated with the shortest single source paths (SSSPs) starting from "question" in the AMR graphs of documents from the training sets of Natural Question (NQ) and TriviaQA (TQA), certain negative documents cannot establish adequate connections to the question context within their text. Moreover, negative documents encounter another extreme scenario where paths contain an abundance of information related to the question text but lack valuable information such as the gold answers. This unique pattern provides valuable insight that is utilized by the disclosed computing system during the encoding process to improve the reranker performance. For example, in some implementations, the document embedding (e.g., document embedding 2262 in FIG. 2B) may be given by $X \in R^{n \times d}$ and each row of X can be given by, for $i \in \{1, 2, \ldots n\}$: $x_i=\text{Encode}(\text{concat}(p_i; a_i))$, where $a_j$ denotes the AMR information with respect to the document $p_i$. For example, the computing system may be configured to obtain the representation of $a_j$ by: 1) finding the shortest single source paths (SSSPs) starting from the node "question" in AMR graph $G_{qpi}$ and each path is not the subset of other paths, e.g., an example path is ['question', 'cross', 'world-region', 'crucifix', 'number', 'be-located-at', 'country', 'Spain']; and 2) extracting the node concepts to construct $a_i$, e.g, part of $a_j$ can be represented as < . . . question cross world-region crucifix number be-located-at country Spain . . . >. For example, $X \in R^{n \times d}$ may correspond to the initial node representation of the graph neural networks. As the GNN iteratively processes information across the graph, the initial node representation may be updated based on the interactions and information exchange with neighboring nodes, ultimately capturing complex relationships and patterns within the graph data.

The computing system may further be configured to leverage edge features associated with undirected edges in AMR $\{G_{qp1}, \ldots, G_{qpn}\}$. If $\hat{E} \in R^{n \times n \times l}$ denotes the edge features of the graph, $\hat{E}_{ij} \in R^l$ can represent the l-dimensional feature vector of the edge between the node $v_i$ and the node $v_j$ (where i/j), and $\hat{E}_{ijk}$ can denote the k-th dimension of the edge feature in $\hat{E}_{ij}$. In an example framework, l=2 and $\hat{E}$ is given by:

$\hat{E}_{ij}$=0, no connection between $G_{qpi}$ and $G_{qpj}$,
$\hat{E}_{ij1}$=# common nodes between $G_{qpi}$ and $G_{qpj}$,
$\hat{E}_{ij2}$=# common edges between $G_{qpi}$ and $G_{qpj}$.

The computing system may be configured to normalize the edge feature $\hat{E}$ to avoid the explosive scale of output node features when being multiplied by the edge feature in graph convolution operations. Thus, the derived feature $\hat{E}$ may be normalized on the first and second dimension, respectively. For example, $E \in R^{n \times n \times l}$ may correspond to the initial edge representation of the graph neural networks. As the GNN iteratively processes information across the graph, the initial edge representation may be updated based on the interactions and information exchange with neighboring nodes, ultimately capturing complex relationships and patterns within the graph data.

Based on the above initial node and edge representations, the computing system may be configured to update representations in the graph neural networks. For example, given a document graph $G(V, \varepsilon)$ with $|V|=n$, the input feature of node $v \in V$ can be denoted as $x^0_v \in R^d$, and the initial representation of the edge between node v and u can be given by $e^0_{uv} \in R^l$ with l=2. For example, $N(v)$ denotes the neighbor nodes of the node $v \in V$. The representation of node $v \in V$ at layer l can be derived from a GNN model given by:

$$x^l_v = g\left(x^{l-1}_v, \bigcup_{u \in N(v)} f(x^{l-1}_u, e^{l-1}_{uv})\right)$$

where f, U, and g are functions for computing feature, aggregating data, and updating node representations, respectively. Specifically, the function f applies different dimensional edge features as weights to the node features, given by:

$$f(x^{l-1}_u, e^{l-1}_{uv}) = \sum_{m=1}^{l} e^{l-1}_{uv}(m) x^{l-1}_u.$$

In some implementations, a mean aggregator may be selected as the operation U. The parameterized function g is a non-linear learnable function that aggregates the representation of the node and its neighbor nodes. Simultaneously, the representation of edge starting from $v \in V$ at layer l is given by:

$$e^l_{v\cdot} = g\left(e^{l-1}_{v\cdot}, \bigcup_{u \in N(v)} e^{l-1}_{u\cdot}\right).$$

For example, the above process can iteratively update node and edge representations through multiple layers of the GNN, allowing nodes to aggregate information from their neighbors and updating their representations accordingly. Similarly, edge representations are updated based on the aggregated representations of their connected nodes.

Given a question q and its document graph $G_q=\{V, \varepsilon\}$, the computing system may be configured to obtain output node representations of a GNN, i.e., $x^L_v$, where L is the number of GNN layers. An encoder may be configured to encode the question q as y=Encode(q). The reranking score for each node $v_i \in V$ corresponding to the document $p_i$ may be calculated by $s_i = y^T x^L_{vi}$ for i=1, ... n and $|V|=n$. Here, y can correspond to the encoded query representation, (e.g., by encoding the query using techniques such as word embeddings or neural network-based encoders). In some implementations, the encoding can capture the semantic meaning of the query. For example, $x^L_v$ can correspond to the final representation of node $v_i$ obtained after L layers of processing in the GNN. Each node representation can capture information about the corresponding document's content, context, and relationships with other documents in the document graph. For example, the reranker 2270 may rank the documents from the second graph 2260 to output the ranked documents 2280.

During training, the cross-entropy training loss of a document ranking for a given question q can be represented as:

$$\mathcal{L}_q = -\sum_{i=1}^{n} y_i \log\left(\frac{\exp(s_i)}{\sum_{j=1}^{n} \exp(s_j)}\right)$$

where $y_i=1$ if $p_i$ is the positive document, and 0 for the negative document. The cross-entropy loss may fail to deal with the unbalanced data in ODQA where the number of negative documents is much greater than the number of positive documents. Therefore, in some implementations, the computing system may be configured to implement a pairwise loss function for ranking. For example, during training, given a pair of scores $s_i$ and $s_j$, the ranking loss may be given by:

$\mathcal{R}\mathcal{L}_q(s_i,s_j,r) = \max(0, -r(s_i-s_j)+1)$ where r=1 if document i should be ranked higher than document j, and vice-versa for r=-1.

Figure 3:
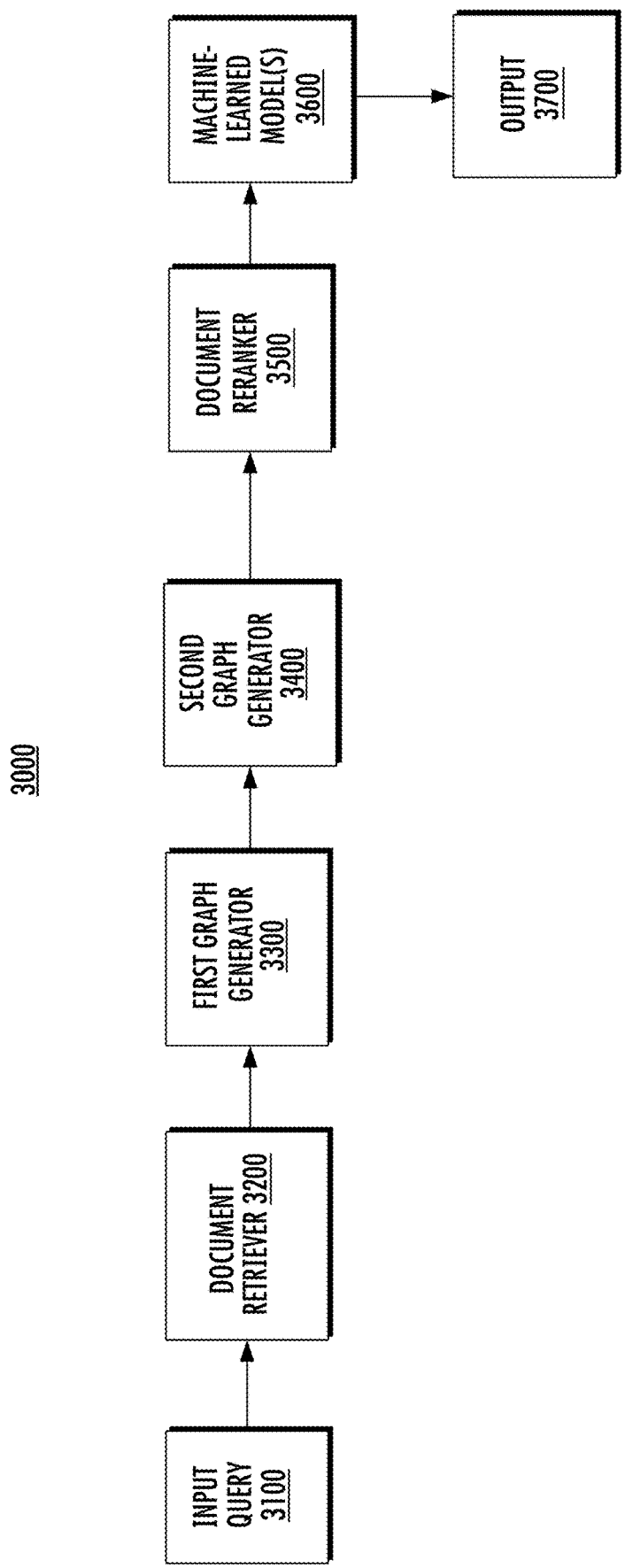
FIG. 3 depicts another example system for reranking documents retrieved in response to receiving a query, according to example embodiments of the disclosure.

FIG. 3 depicts another example system for reranking documents retrieved in response to receiving a query, according to example embodiments of the disclosure.

Aspects of the example system 3000 of FIG. 3 correspond to the example system of FIGS. 2A-2B, and therefore some details will not be repeated herein for the sake of brevity. The example system 3000 of FIG. 3 may be implemented by one or more of user computing system 102, server computing system 130, or training computing system 150, or a combination thereof. Unless otherwise specified, references to a "computing system" herein refers to the user computing system 102 alone, server computing system 130 alone, training computing system 150 alone, or any combination thereof. Thus, each of the components of FIG. 3 can be included in user computing system 102 alone, server computing system 130 alone, training computing system 150 alone, or any combination thereof.

In the example system 3000 of FIG. 3, the computing system is configured to receive an input query 3100 (e.g., via user input component 122). The system 3000 may correspond to an open-domain question answering system which implements operations involving natural language processing (NLP), information retrieval, and machine learning to extract and synthesize information from diverse sources to generate responses (e.g., answers) to user queries.

Document retriever 3200 may be configured to extract a set of documents from among a plurality of open-source documents for the given input query 3100 (e.g., question). For example, the document retriever 3200 may be configured to implement a dense embedding-based passage retrieval (DPR) model to extract the set of documents. For example, the computing system may be configured to retrieve a plurality of documents in response to receiving the input query 3100. In some implementations, a document may correspond to a passage of a certain length (e.g., 50 words, 100 words, etc.) from a larger document (e.g., text corpus).

First graph generator 3300 may be configured to generate a first graph (e.g., the first graph 2240) by concatenating the input query 3100 (the question q) with a document p as "question: <question text><document text>" and then implement the sequence-to-sequence parser 2230 (e.g., AMRBART or other sequence-to-sequence AMR parser models), to parse the sequence into the first graph (e.g., an AMR graph), as described with respect to FIG. 2B.

Second graph generator 3400 may be configured to generate a second graph (e.g., the second graph 2240 which may correspond to a document graph) based on the first graphs (e.g., the AMR graphs) for the plurality of documents 2120. For example, the computing system may be configured to generate (form) the second graph 2260 (e.g., the document graph) given one question q and documents $\{p_1, \ldots, p_n\}$ (e.g., with n=100). The second graph 2260 may be represented as $G_q=\{V, \varepsilon\}$ based on AMRs $\{G_{qp1}, \ldots, G_{qpn}\}$, as described with respect to FIG. 2B.

Document reranker 3500 may be configured to rerank the plurality of documents based on a reranking score for each node in the second graph (e.g., the document graph). The reranking score for each node $v_i \in V$ corresponding to the document $p_i$ may be calculated by $s_i = y^T x^L_{vi}$ for i=1, ... n and |V|=n, as described herein.

After the plurality of documents are reranked, the one or more machine-learned models 3600 (e.g., one or more large-language models) may be configured to extract relevant information from the top-ranked documents to generate an answer to the input query 3100. For example, the one or more machine-learned models 3600 may be configured to process each document (e.g., by implementing natural language processing) to tokenize, parse, and analyze the content (text) from the top-ranked documents. For example, the one or more machine-learned models 3600 may be configured to construct or generate an output 3700 (e.g., an answer) based on the extracted information (e.g., by combining information from multiple passages or documents, summarizing the content, or generating a response based on a single passage). In some implementations, the answer may be presented via an output device (e.g., via presentation on a display device, through a speaker, etc.).

Example Methods

Figure 4:
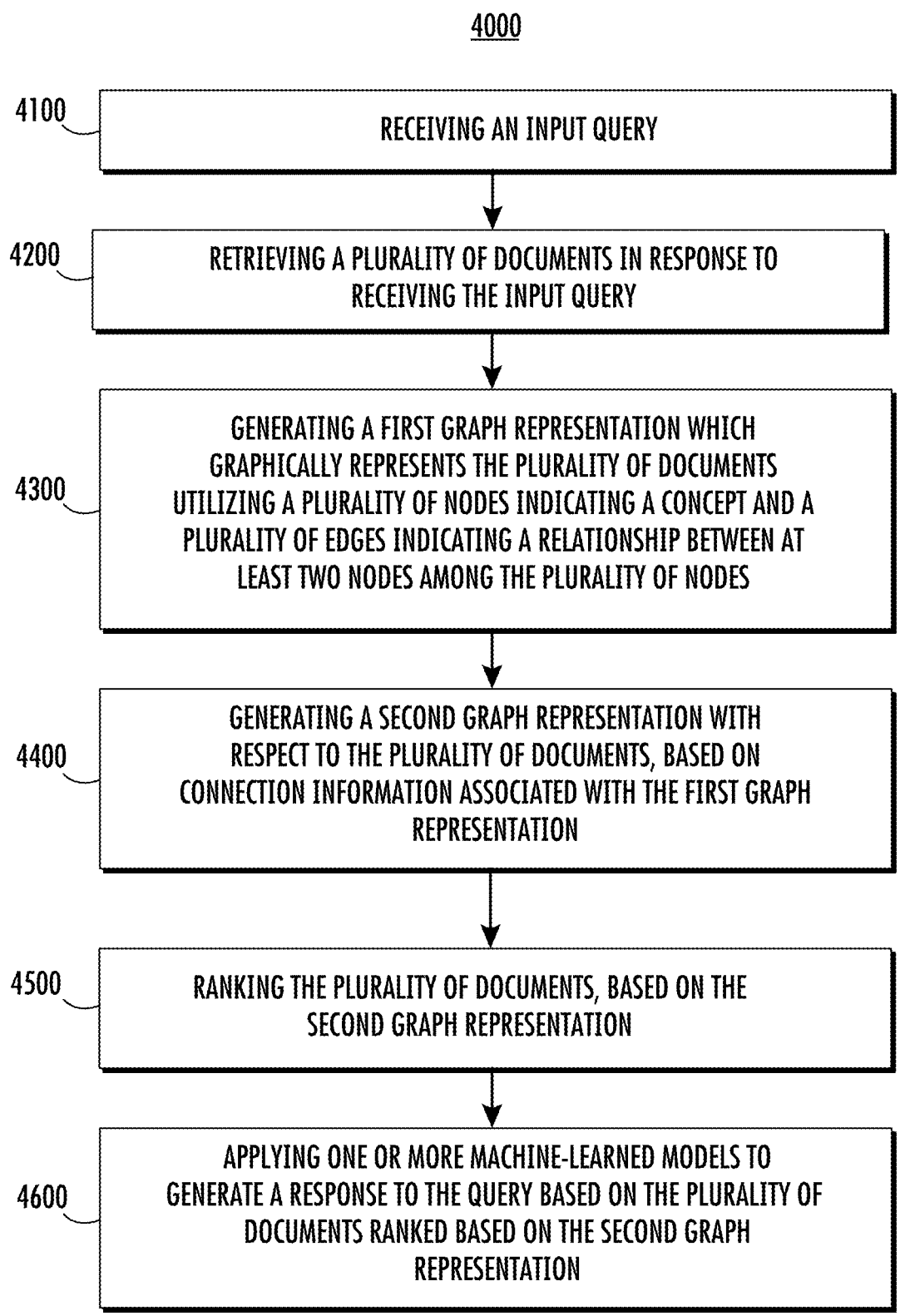
FIG. 4 depicts a flow chart diagram of an example method to perform according to example embodiments of the disclosure.

FIG. 4 depicts a flow chart diagram of an example method to perform according to example embodiments of the disclosure. Although FIG. 4 depicts operations performed in a particular order for purposes of illustration and discussion, the methods of the disclosure are not limited to the particularly illustrated order or arrangement. The various operations of the method 4000 can be omitted, rearranged, combined, and/or adapted in various ways without deviating from the scope of the disclosure.

According to some examples of the disclosure, a computing system (e.g., user computing system 102, server computing system 130, training computing system 150, or combinations thereof) may be configured to generate an answer for an input query by implementing the reranking systems described herein.

At 4100, the method 4000 may include a computing system (e.g., user computing system 102, server computing system 130, training computing system 150) receiving an input query (e.g., a question). For example, the computing system may be received via user input component 122. For example, the input query may be in the form of a question.

At 4200, the method 4000 may include the computing system retrieving a plurality of documents in response to receiving the input query. For example, the computing system may include a document retriever (e.g., document retriever 3200) configured to extract a plurality of documents from among a plurality of open-source documents in an open-domain question answering environment, for the given question. For example, the document retriever may be configured to implement a dense embedding-based passage retrieval (DPR) model to extract the plurality of documents. For example, the computing system may be configured to retrieve a plurality of documents in response to receiving the query. In some implementations, at least some documents from among the plurality of documents correspond to a passage from a text corpus. For example, the passage may have a predetermined length (e.g., 50 words, 100 words, etc.).

At 4300, the method 4000 may include the computing system generating a first graph representation which graphically represents the plurality of documents utilizing a plurality of nodes indicating a concept and a plurality of edges indicating a relationship between at least two nodes among the plurality of nodes. For example, the computing system may be configured to generate (form) the first graph representation (e.g., first graph 2240) by concatenating the input (the question q) with a document p as "question: <question text><document text>" and then implement a sequence-to-sequence parser (e.g., AMRBART or other sequence-to-sequence AMR parser models), to parse the sequence into the first graph representation (e.g., an AMR graph).

At 4400, the method 4000 may include the computing system generating a second graph representation with respect to the plurality of documents, based on connection information associated with the first graph representation. For example, the computing system may be configured to generate (form) the second graph representation (e.g., second graph 2260) based on the AMR graphs for the plurality of documents. For example, the computing system may be configured to generate (form) the second graph representation (e.g., the document graph) given one question q and documents $\{p_1, \ldots, p_n\}$ (e.g., with n=100). The second graph representation may be represented as $G_q=\{V, \varepsilon\}$ based on AMRs $\{G_{qp1}, \ldots, G_{qpn}\}$. For example, generating the second graph representation including the document graph can include removing isolated nodes from the document graph.

In some implementations, generating the second graph representation can include generating document embeddings for the plurality of documents by encoding a concatenation of each document with the AMR connection information. For example, in some implementations, a document embedding (e.g., document embedding 2262 in FIG. 2B) may be given by $X \in R^{n \times d}$ and each row of X can be given by, for $i \in \{1, 2, \ldots n\}$: $x_i$=Encode(concat($p_i$; $a_i$)), where $a_i$ denotes the AMR information with respect to the document $p_i$. In some implementations, the AMR connection information includes one or more single source shortest paths from a first node among the plurality of nodes to one or more other nodes among the plurality of nodes. For example, the first node may be a question node, and each of the one or more single source shortest paths may start from the question node.

In some implementations, the document reranker 3500 may be configured to rerank the plurality of documents based on one or more machine-learned models (e.g., one or more graph neural networks) that are derived from the document graph. For example, the one or more graph neural networks can include one or more 2-layer graph convolutional networks. For example, the one or more machine-learned models (e.g., one or more graph neural networks) may be configured to update the second graph representation for each of a plurality of layers of the one or more machine-learned models by applying a function that aggregates a representation of one or more nodes (e.g., a first node) from the document graph and one or more neighboring nodes (e.g., a second node neighboring the first node) from the document graph.

At 4500, the method 4000 may include the computing system ranking the plurality of documents, based on the second graph representation. For example, the document reranker 3500 may be configured to rerank each of the plurality of documents based on a reranking score for each node in the second graph representation (e.g., the document graph, where each node corresponds to a different document). The reranking score for each node $v_i \in V$ corresponding to the document $p_i$ may be calculated by $s_i = y^T x^L_{v_i}$ for $i=1, \ldots n$ and $|V|=n$, as described herein. In some implementations, ranking the plurality of documents may be based on the second graph representation and a pairwise loss function. For example, the reranking system (e.g., the document reranker 3500) may be trained via a pairwise loss function or a cross-entropy loss function.

Metrics such as the Mean Reciprocal Rank (MRR) and Mean Hits@10 (MHits@10) may fail to fairly characterize the ranking performance of a reranker when there are ties in ranking scores. In some implementations, the computing system may be configured to implement a particular metric to characterize a ranking performance when there are ties in ranking scores. For example, the computing system may be configured to implement a variant of MRR for tied ranking (referred to as Mean Tied Reciprocal Ranking or MTRR), represented as:

$$MTRR = \frac{1}{|Q|} \sum_{q \in Q} \left( \frac{1}{|\mathcal{P}^+|} \sum_{p \in \mathcal{P}^+} \frac{1}{r_p^{(t)}} \mathbb{1}(t=1) + \frac{2}{r_p^{(t)} + r_p^{(t)} + t - 1} \mathbb{1}(t>1) \right).$$

The metric MTRR addresses the tied rank $r^{(t)}_p$ estimated by the reranker via averaging the optimistic rank $r^{(t)}_p$ and the pessimistic rank $r^{(t)}_p + t - 1$.

In some implementations, the computing system may be configured to implement an additional, or alternative, particular metric to characterize the ranking performance when there are ties in ranking scores. For example, the computing system may be configured to implement a variant of Mean Hits@10 for tied ranking (referred to as Tied Mean Hits@10 or TMHit@10), represented as:

$$TMHits@10 = \frac{1}{|Q|} \sum_{q \in Q} \left( \frac{1}{|\mathcal{P}^+|} \sum_{p \in \mathcal{P}^+} Hits@10(p) \right),$$

where Hits@10(p) is defined as $$\begin{cases} 0, & \text{if } \sum_i t_i > 10 \text{ for } \forall\ r_{p_i}^{(t_i)} \in \mathcal{H}(p), \\ \left(10 - \sum_i t_i\right)/\tau, & \text{if } 0 < \sum_i t_i > 10 \\ & \text{for } \forall\ r_{p_i}^{(t_i)} \in \mathcal{H}(p) \text{ and } \tau > 1. \\ 10/\tau, & \text{if } \mathcal{H}(p) = \emptyset \text{ and } \tau > 10. \\ 1, & \text{otherwise.} \end{cases}$$

For example, if there are ties in the Top-10 ranking, the computing system may be configured to implement the TMHit@10 metric to diminish the optimistic effect via dividing the hit-number (no greater than 10) by the number of ties. While example ranking metrics have been described herein, the disclosure is not limited to these ranking metrics and other known ranking metrics and methods may be implemented to characterize the ranking performance of a reranker.

At 4600, the method 4000 may include the computing system applying one or more machine-learned models to generate a response to the query based on the plurality of documents ranked based on the second graph representation. For example, after the plurality of documents are reranked, one or more machine-learned models (e.g., one or more large-language models) may be configured to extract relevant information from the top-ranked documents to generate an answer to the input query. For example, the one or more machine-learned models 3600 may be configured to process each document (e.g., by implementing natural language processing) to tokenize, parse, and analyze the content (text) from the top-ranked documents. For example, the one or more machine-learned models 3600 may be configured to construct or generate an output 3700 (e.g., an answer) based on the extracted information (e.g., by combining information from multiple passages or documents, summarizing the content, or generating a response based on a single passage).

Experimental Results

Example reranking systems as described herein were implemented under various conditions to rerank documents which were retrieved based on an input query. Evaluations of the results of the example reranking systems are described herein.

For example, experiments were conducted on two representative ODQA datasets (Natural Questions (NQ) and TriviaQA (TQA)). DPR was used to retrieve 100 documents for each question and generate the AMR graph for each question-document pair using AMRBART. The experiments were conducted on a Tesla A100 40 GB GPU, demonstrating the low computational needs of the disclosed reranking method.

In the experiment, the reranking system implemented a graph neural network having a 2-layer Graph Convolutional Network with hidden dimension chosen from {8, 64, 128} via hyperparameter-tuning. The dropout rate was chosen from {0.1, 0.2, 0.4}. The GNN node features were initialized using pre-trained models, e.g, BERT, GTE, BGE, Ember. For training the reranking system (framework), we adopt the optimizer AdamW with the learning rate chosen from {5e-5, 1e-4, 5e-4}; batch size set to 5, learning rate warm-up set with 1,000 steps, and the number of total training steps being 50k, with the model being evaluated every 10k steps. The below table provides simulation results regarding various reranking methods with hidden dimensions set to 8, dropout rate set to 0.1, and the learning rate set to 1e-4:

| Strategy/ Metric | NQ | | TQA | |
| --- | --- | --- | --- | --- |
| | MRR_dev/ MRR_test | MH@10_dev/ MH@10_test | MRR_dev/ MRR_test | MH@10_dev/ MH@10_test |
| w/o reranker | 20.2/18.0 | 37.9/34.6 | 12.1/12.3 | 25.5/25.9 |
| BART | 25.7/23.3 | 49.3/45.8 | 16.9/17.0 | 37.7/38.0 |

-continued

| Strategy/ Metric | NQ | | TQA | |
|---|---|---|---|---|
| | MRR_dev/ MRR_test | MH@10_dev/ MH@10_test | MRR_dev/ MRR_test | MH@10_dev/ MH@10_test |
| BART-GST | 28.4/25.0 | 53.2/48.7 | 17.5/17.6 | 39.1/39.5 |
| RGCN-S | 26.1/23.1 | 49.5/46.0 | — | — |
| MLP | 19.2/17.8 | 40.0/38.8 | 17.6/17.1 | 34.0/31.4 |
| GCN | 22.6/22.4 | 47.6/44.2 | 18.2/17.4 | 38.0/37.0 |
| G-RAG | 25.1/24.2 | 49.1/47.2 | 18.5/18.3 | 38.5/39.1 |
| G-RAG-RL | 27.3/25.7 | 49.2/47.4 | 19.8/18.3 | 42.9/39.4 |

The disclosed methods (G-RAG and G-RAG-RL which uses the ranking loss RL function) show competitive performance across metrics and have advantages over the baseline models (e.g., without the reranker where ranking scores are based on DPR retrieval scores, and MLP).

The below table provides simulation results regarding zero-shot experiments conducted on the dev and test sets of the NQ and TQA datasets:

| Strategy/ Metric | NQ | | | | TQA | | | |
|---|---|---|---|---|---|---|---|---|
| | MTRR_dev | MTRR_test | TMH_dev | TMH_test | MTRR_dev | MTRR_test | TMH_dev | TMH_test |
| w/o reranker | 20.2 | 18.0 | 37.9 | 34.6 | 12.1 | 12.3 | 25.5 | 25.9 |
| BART | 25.7 | 23.3 | 49.3 | 45.8 | 16.9 | 17.0 | 37.7 | 38.0 |
| PaLM 2 XS | 14.9 | 14.0 | 34.1 | 34.2 | 11.6 | 12.5 | 29.1 | 31.6 |
| PaLM 2 L | 18.6 | 17.9 | 40.7 | 39.7 | 12.7 | 12.9 | 34.7 | 35.6 |
| G-RAG-RL | 27.3 | 25.7 | 49.2 | 47.4 | 19.8 | 18.3 | 42.9 | 39.4 |

The results demonstrate that LLMs with zero-shot learning does not do well in reranking tasks. This may be caused by too many ties in the relevance scores, especially for small-size LLMs where there are more ties. In contrast, according to the methods disclosed herein (e.g., G-RAG and G-RAG-RL), leveraging the information about connections of entities across documents and documents themselves brings significant improvements up to 7 percentage points.

FIGS. 5A-5B depict example results of the reranking system described herein, according to examples of the disclosure. FIGS. 5A-5B illustrate the Top-10 documents obtained by implementing the disclosed method including first through fifth documents 5100 and sixth through tenth documents 5200. In the results shown by FIGS. 5A-5B, each document is accompanied by relevant information about its AMR graph, including the number of nodes and edges, as well as the count of single-source shortest paths (SSSPs) originating from the node labeled "question". If the node "question" is not present in the AMR graph, the SSSPs count is noted as 0. Additionally, the corresponding score assigned by palm 2-L and its rank based on the palm 2 reranker are presented. Finally, ranking assigned by the retriever DPR is also provided for reference.

As can be seen from FIGS. 5A-5B, documents (such as 1st, 2nd, and 4th) containing exact words from the question (i.e., these words are "Ol' Blue Eyes" and "nickname" in our example) are prioritized at the top by most rankers. However, if a document includes word variations or lacks sufficient keywords, it poses a challenge for the baseline reranker to identify its relevance (e.g., see the 9th and 10th documents). The disclosed method can overcome this challenge by implementing the AMR graph of documents to comprehend more intricate semantics. The SSSPs from the 'question' node in the AMR graph also indicate the underlying connections between the question and the words in the documents.

Another challenging scenario for the baseline reranker arises when several keywords or even gold answers are present in the documents but are weakly connected, making recognition difficult. For example, in the 7th, 8th, and 9th documents there are both "Ol' Blue Eyes" and "Sinatra" which are gold answers, yet these words are not directly linked in the sentence: "Ol' Blue Eyes is the nickname of "Sinatra". Instead, the connection between these two words is very loose. However, according to the disclosed method, the 7th, 8th, and 9th documents are connected to the 1st document in the document graph due to common nodes like 'Sinatra' and 'Ol Blue Eyes.' The 1st document stands out as more easily identifiable as a positive document, given its incorporation of all keywords from the questions. These words not only have a strong connection but also collectively contribute to a cohesive answer to the question. Leveraging this information and employing a message-passing mechanism, the disclosed method can enable the 7th, 8th, and 9th document to adeptly discern potential keywords. Consequently, this approach enhances their ranking, based on the insights derived from the well-connected and information-rich 1st document.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described in detail with respect to various example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the subject matter as would be readily apparent to one of ordinary skill in the art. For instance, features illustrated or described as part of one embodiment can be used with another embodiment to yield a still further embodiment. Thus, it is intended that the disclosure covers such alterations, variations, and equivalents.

What is claimed is:

1. A computer-implemented method, comprising:
   in response to receiving a query, retrieving, by a computing system comprising one or more processors, a plurality of documents stored in one or more databases;
   generating, by the computing system, a first graph representation which graphically represents the plurality of documents utilizing a plurality of nodes indicating a concept and a plurality of edges indicating a relationship between at least two nodes among the plurality of nodes;
   generating, by the computing system, a second graph representation with respect to the plurality of documents, based on connection information associated with the first graph representation, the connection information representing structural information and semantic information between nodes among the plurality of nodes representing the plurality of documents;
   ranking, by the computing system, the plurality of documents, based on the second graph representation; and
   applying, by the computing system, one or more first machine-learned models, to generate a response to the query based on the plurality of documents ranked based on the second graph representation.

2. The computer-implemented method of claim 1, wherein
   the first graph representation includes an abstract meaning representation (AMR) graph, and
   the second graph representation includes a document graph generated based on AMR connection information.

3. The computer-implemented method of claim 2, wherein generating the second graph representation including the document graph comprises removing isolated nodes from the document graph.

4. The computer-implemented method of claim 2, wherein generating the second graph representation comprises generating document embeddings for the plurality of documents by encoding a concatenation of each document with the connection information.

5. The computer-implemented method of claim 2, wherein the connection information includes one or more single source shortest paths from a first node among the plurality of nodes to one or more other nodes among the plurality of nodes.

6. The computer-implemented method of claim 5, wherein
   the first node is a question node, and
   each of the one or more single source shortest paths start from the question node.

7. The computer-implemented method of claim 2, further comprising applying one or more second machine-learned models to update the second graph representation for each of a plurality of layers of the one or more second machine-learned models by applying a function that aggregates a representation of a first node from the document graph and one or more neighboring nodes of the first node from the document graph.

8. The computer-implemented method of claim 7, wherein the one or more second machine-learned models include one or more graph neural networks.

9. The computer-implemented method of claim 8, the one or more graph neural networks include one or more 2-layer graph convolutional networks.

10. The computer-implemented method of claim 1, wherein
    at least some documents from among the plurality of documents correspond to a passage from a text corpus, the passage having a predetermined length.

11. The computer-implemented method of claim 1, wherein retrieving the plurality of documents comprises implementing a dense embedding-based passage retrieval model to extract the plurality of documents in an open-domain question answering environment.

12. The computer-implemented method of claim 1, wherein ranking the plurality of documents is based on the second graph representation and a pairwise loss function.

13. A computing system, comprising:
    one or more processors; and
    one or more non-transitory computer-readable media that store instructions that, when executed by the one or more processors, cause the computing system to perform operations, the operations comprising:
       in response to receiving a query, retrieving a plurality of documents stored in one or more databases;
       generating a first graph representation which graphically represents the plurality of documents utilizing a plurality of nodes indicating a concept and a plurality of edges indicating a relationship between at least two nodes among the plurality of nodes;
       generating a second graph representation with respect to the plurality of documents, based on connection information associated with the first graph representation, the connection information representing structural information and semantic information between nodes among the plurality of nodes representing the plurality of documents;

ranking the plurality of documents, based on the second graph representation; and applying one or more machine-learned models to generate a response to the query based on the plurality of documents ranked based on the second graph representation.

14. The computing system of claim 13, wherein the first graph representation includes an abstract meaning representation (AMR) graph, and the second graph representation includes a document graph generated based on AMR connection information.

15. The computing system of claim 14, wherein generating the second graph representation including the document graph comprises removing isolated nodes from the document graph.

16. The computing system of claim 14, wherein generating the second graph representation comprises generating document embeddings for the plurality of documents by encoding a concatenation of each document with the connection information.

17. The computing system of claim 14, wherein the connection information includes one or more single source shortest paths from a first node among the plurality of nodes to one or more other nodes among the plurality of nodes.

18. The computing system of claim 14, wherein the operations further comprise:

applying one or more second machine-learned models to update the second graph representation for each of a plurality of layers of the one or more second machine-learned models by applying a function that aggregates a representation of a first node from the document graph and one or more neighboring nodes of the first node from the document graph.

19. The computing system of claim 18, wherein the one or more second machine-learned models include one or more graph neural networks, and the one or more graph neural networks include one or more 2-layer graph convolutional networks.

20. One or more non-transitory computer-readable media that collectively store instructions that, when executed by one or more processors, cause the one or more processors to perform operations, the operations comprising:

in response to receiving a query, retrieving a plurality of documents stored in one or more databases;

generating a first graph representation which graphically represents the plurality of documents utilizing a plurality of nodes indicating a concept and a plurality of edges indicating a relationship between at least two nodes among the plurality of nodes;

generating a second graph representation with respect to the plurality of documents, based on connection information associated with the first graph representation, the connection information representing structural information and semantic information between nodes among the plurality of nodes representing the plurality of documents;

ranking the plurality of documents, based on the second graph representation; and applying one or more machine-learned models to generate a response to the query based on the plurality of documents ranked based on the second graph representation.

* * * * *